(12) United States Patent
Buehlmann et al.

(10) Patent No.: US 7,885,169 B2
(45) Date of Patent: Feb. 8, 2011

(54) ELECTRIC FIELD SENSOR HAVING VERTICAL STRUCTURE, FABRICATION METHOD THEREOF, AND STORAGE UNIT USING THE SAME

(75) Inventors: Simon Buehlmann, Yongin-si (KR); Hyoung-soo Ko, Seoul (KR); Ju-hwan Jung, Seoul (KR); Seung-bum Hong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 405 days.

(21) Appl. No.: 12/138,055

(22) Filed: Jun. 12, 2008

(65) Prior Publication Data

US 2009/0092033 A1 Apr. 9, 2009

(30) Foreign Application Priority Data

Oct. 9, 2007 (KR) ...................... 10-2007-0101667

(51) Int. Cl.
*G11B 7/00* (2006.01)
(52) U.S. Cl. ...................................... 369/126; 369/100
(58) Field of Classification Search ....................... None
See application file for complete search history.

(56) References Cited

U.S. PATENT DOCUMENTS 6,477,132 B1* 11/2002 Azuma et al. ............... 369/126

* cited by examiner

*Primary Examiner*—Muhammad N Edun
(74) *Attorney, Agent, or Firm*—Sughrue Mion, PLLC

(57) ABSTRACT

An electric field sensor includes a substrate having a low resistive semiconductor layer doped with a high-density dopant as the top layer of the substrate, a high resistive semiconductor layer doped with a low-density dopant, the high resistive semiconductor layer located at a partial area on the low resistive semiconductor layer, and a conductive layer located on the high resistive semiconductor layer, wherein a change of an electric field is detected by a change of a current flowing through the low resistive semiconductor layer, the high resistive semiconductor layer, and the conductive layer.

23 Claims, 15 Drawing Sheets

ELECTRIC FIELD SENSOR HAVING VERTICAL STRUCTURE, FABRICATION METHOD THEREOF, AND STORAGE UNIT USING THE SAME

CROSS-REFERENCE TO RELATED PATENT APPLICATION

This application claims the benefit of Korean Patent Application No. 10-2007-0101667, filed on Oct. 9, 2007, in the Korean Intellectual Property Office, the disclosure of which is incorporated herein in its entirety by reference.

BACKGROUND OF THE INVENTION

1. Field of the Invention

The present invention relates to an electric field sensor, a fabrication method thereof, and a storage unit having the same.

2. Description of the Related Art

Hard disk drives (HDDs) are devices for writing and reading information by using a magnetic read/write head while a recording medium rotates, and are mainly used as main storage units of personal computers (PCs). That is, according to a magnetic recording method, a plurality of magnetic domains, which are magnetized in a first direction and an inverse direction to the first direction (hereinafter, referred to as a 'second direction'), are generated on a magnetic recording medium using a magnetic field, such that the magnetic domains magnetized in the first direction and the second direction respectively correspond to data '0' and data '1'.

The recording density of HDDs employing such magnetic recording method has rapidly increased for recent years, and accordingly, it is expected for HHDs employing a horizontal magnetic recording method to have a recording density of around 100 Gb/in$^2$ and HHDs employing a vertical magnetic recording method to have a recording density of a maximum of 500 Gb/in$^2$. However, since it is difficult to generate a strong local magnetic field with a magnetic read/write head, the increase in recording density is limited.

Recently, researches have been conducted on a ferroelectric recording medium, in which data is recorded by an electric field instead of a magnetic field, and an electric field sensor for reading and writing the data. Such electric field recording method forms electric domains polarized in a first direction and an inverse direction to the first direction (hereinafter, referred to as a 'second direction') on the surface of a ferroelectric material using an electric field, where the electric domains polarized in the first direction and the second direction respectively correspond to data '0' and '1'. Since a resistance of an electric field sensor located on an electrical domain depends on a polarized direction of the electrical domain, an amperage of a current flowing between a source electrode and a drain electrode of a $\hat{\leftrightarrows}$electric field sensor differs according to the resistance. Thus, information recorded in the electrical domain can be read by detecting a change in the current. According to the electric field recording and reproducing method, a recording density of more than 1 Tb/in$^2$ can be obtained.

An electric field sensor provides an electric field inducing polarization in a recording medium when recording and detects a change in an electric field induced by a polarization voltage of an electrical domain of the recording medium when reproducing.

SUMMARY OF THE INVENTION

The present invention provides an electric field sensor having a vertical structure, a fabrication method thereof, and a storage unit including the electric field sensor.

According to an aspect of the present invention, there is provided an electric field sensor comprising: a substrate having a low resistive semiconductor layer doped with high density dopant as the top layer of the substrate; a high resistive semiconductor layer doped with a low-density dopant, the high resistive semiconductor layer located at a partial area on the low resistive semiconductor layer; and a conductive layer located on the high resistive semiconductor layer, wherein a change of an electric field is detected by a change of a current flowing through the low resistive semiconductor layer, the high resistive semiconductor layer, and the conductive layer.

According to another aspect of the present invention, there is provided a storage unit comprising: a ferroelectric recording medium; and an electric field sensor reading information of the ferroelectric recording medium based on a change of a current according to a magnitude of an electric field induced by a polarization voltage of an electrical domain of the ferroelectric recording medium, the electric field sensor comprising: a substrate having a low resistive semiconductor layer doped with a high-density dopant as the top layer of the substrate; a high resistive semiconductor layer doped with a low-density dopant, the high resistive semiconductor layer located at a partial area on the low resistive semiconductor layer; and a conductive layer located on the high resistive semiconductor layer, wherein the low resistive semiconductor layer, the high resistive semiconductor layer, and the conductive layer are located in a relative movement direction of the recording medium and the electric field sensor.

The low resistive semiconductor layer may be insulated from a material forming the substrate located by an insulation layer.

The electric field sensor may further comprise a first insulation layer located on the low resistive semiconductor layer, except for the partial area on which the high resistive semiconductor layer is located.

The low resistive semiconductor layer and the high resistive semiconductor layer may be semiconductor layers having an epitaxial single crystal structure.

The electric field sensor may further comprise a write electrode formed on a second insulation layer located on the conductive layer.

According to another aspect of the present invention, there is provided a method of fabricating an electric field sensor, the method comprising: preparing a substrate in which a low resistive semiconductor layer insulated from an area below the low resistive semiconductor layer and doped with a high-density dopant is formed as the top layer of the substrate; forming a high resistive semiconductor layer doped with a low-density dopant on a partial area on the low resistive semiconductor layer; and forming a conductive layer on the high resistive semiconductor layer.

The forming of the high resistive semiconductor layer on the partial area may comprise: forming the high resistive semiconductor layer on the low resistive semiconductor layer by epitaxial depositing a low-density dopant and the same material as a base material of the low resistive semiconductor layer; forming a mask on the high resistive semiconductor layer such that the mask corresponds to the partial area; and etching the high resistive semiconductor layer, except for the partial area, by using the mask until the low resistive semiconductor layer is exposed.

The forming of the high resistive semiconductor layer on the partial area may comprise: epitaxial depositing the same material as a base material of the low resistive semiconductor layer on the low resistive semiconductor layer; forming the high resistive semiconductor layer by implanting a low-density dopant into the deposited material layer; forming a mask on the high resistive semiconductor layer such that the mask corresponds to the partial area; and etching the high resistive semiconductor layer, except for the partial area, by using the mask until the low resistive semiconductor layer is exposed.

The forming of the conductive layer may comprise: forming a first insulation layer on the mask and the exposed low resistive semiconductor layer; exposing the high resistive semiconductor layer by removing the first insulation layer on the mask and the mask; and forming the conductive layer by depositing an electrical conductor on the exposed high resistive semiconductor layer. The electrical conductor may be a low resistive semiconductor material doped with a high-density dopant. The electrical conductor may include a metallic material that ohmic-contacts with the high resistive semiconductor layer.

The forming of the high resistive semiconductor layer on the partial area may comprise: forming a first insulation layer on the low resistive semiconductor layer; forming a mask on the first insulation layer, except on the partial area; exposing the low resistive semiconductor layer by etching the first insulation layer corresponding to the partial area by using the mask; removing the mask; forming the high resistive semiconductor layer by depositing a low-density dopant and a semiconductor material on the exposed low resistive semiconductor layer and the first insulation layer; and removing the high resistive semiconductor layer until the first insulation layer is exposed in an area except for the partial area.

The removing of the high resistive semiconductor layer may comprise polishing the high resistive semiconductor layer until the first insulation layer is exposed. The polishing of the high resistive semiconductor layer may be performed by a chemical-mechanical-polishing (CMP) process.

The method may further comprise forming a second insulation layer in an area in which the high resistive semiconductor layer on the conductive layer is formed and forming a write electrode on the second insulation layer.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
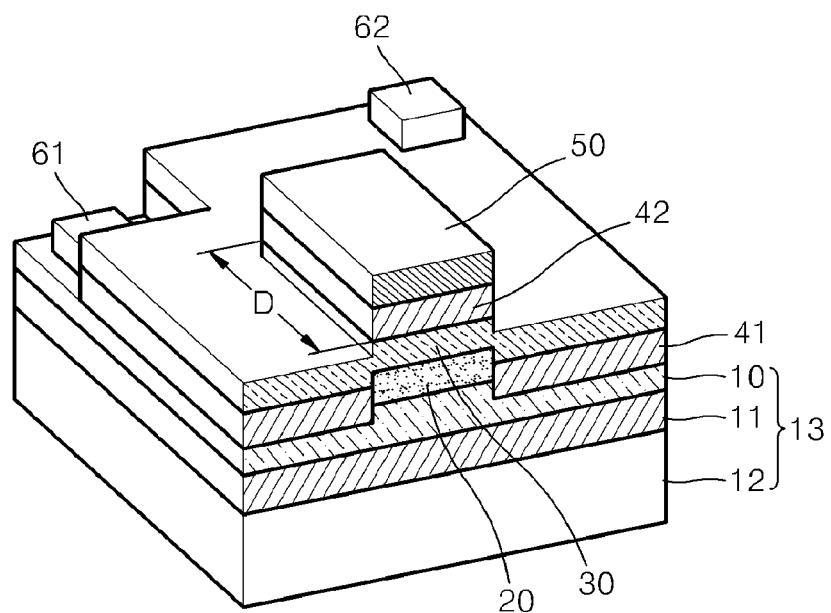
FIG. 1 is a perspective diagram of an electric field sensor according to an embodiment of the present invention.

The present invention will be described in detail by explaining embodiments of the invention with reference to the attached drawings. In the drawings, the widths and thicknesses of layers and regions are exaggerated for clarity. Like reference numerals in the drawings denote like elements.

Figure 2:
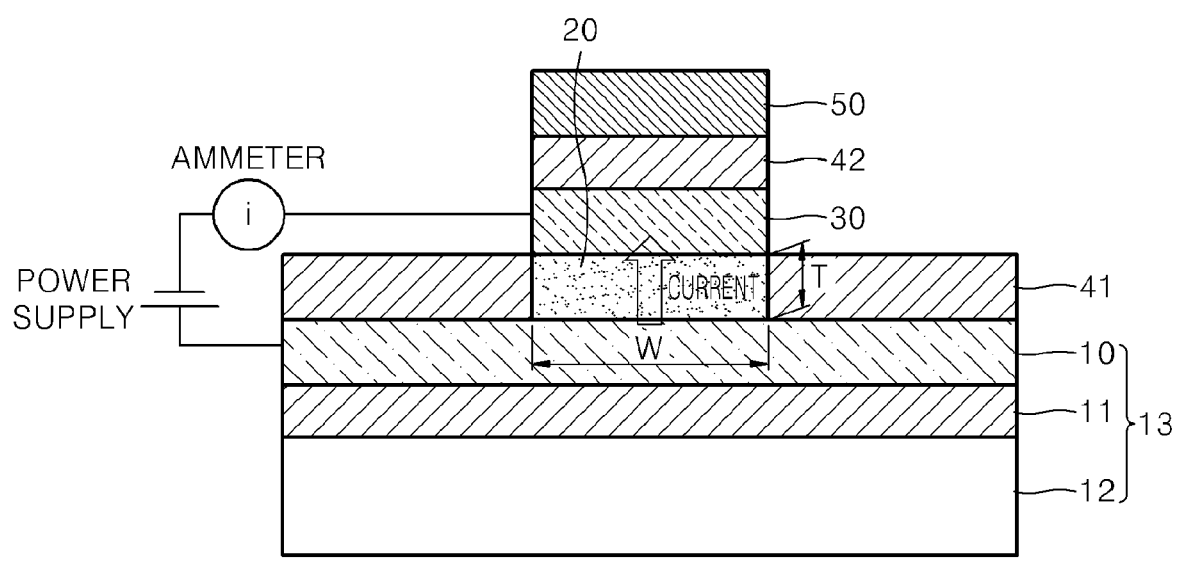
FIG. 2 is a cross sectional view of the electric field sensor illustrated in FIG. 1.

FIG. 1 is a perspective diagram of an electric field sensor according to an embodiment of the present invention, and FIG. 2 is a cross sectional view of the electric field sensor illustrated in FIG. 1. Referring to FIGS. 1 and 2, a low resistive semiconductor layer 10 is located as the top layer of a substrate 13. A high resistive semiconductor layer 20 is located at a partial area on the low resistive semiconductor layer 10. A conductive layer 30 is located on the high resistive semiconductor layer 20.

The low resistive semiconductor layer 10 is a p- or n-type semiconductor material layer doped with a high-density dopant. The high resistive semiconductor layer 20 is a p- or n-type semiconductor material layer doped with a low-density dopant. A base material of the low resistive semiconductor layer 10 is preferably the same as that of the high resistive semiconductor layer 20. For example, Silicon (Si) can be used as the base material of the low resistive semiconductor layer 10 and the high resistive semiconductor layer 20. In addition, the base material may have a single crystal structure. For an n-type dopant, P or As can be used for example, and B can be used for a p-type dopant. Hereinafter, a case where the low resistive semiconductor layer 10 and the high resistive semiconductor layer 20 are n-type semiconductor material layers in which Si is the base material will be described.

The low resistive semiconductor layer 10 is a single crystal silicon layer doped with a high-density n-type dopant. For example, a doping density of the dopant is around $10^{21}/cm^3$. In order to make the operability of the electric field sensor good, the low resistive semiconductor layer 10 may be a very thin film type, for example, the thickness of the low resistive semiconductor layer 10 may be tens or hundreds of nanometers. The low resistive semiconductor layer 10 is insulated from a lower layer 12 by an insulation layer 11. For the substrate 13, a silicon on insulator (SOI) substrate that is available in the market can be used. In addition, the substrate 13 may be an insulation wafer, such as glass or silicon, having an insulation layer on top. The low resistive semiconductor layer 10 having a thickness of tens or hundreds of nanometers may be bonded to the insulation layer 11.

The high resistive semiconductor layer 20 is a silicon layer doped with a low-density n-type dopant with doping density of, for example, around $10^{15}/cm^3$. The low resistive semiconductor layer 10, which is a single crystal silicon layer, acts as a template when the high resistive semiconductor layer 20 is formed by depositing the same semiconductor material and dopant on the low resistive semiconductor layer 10. Thus, the high resistive semiconductor layer 20 having a very good epitaxial single crystal structure can be formed. The high resistive semiconductor layer 20 requires very excellent semiconductor characteristics as the most important component of the electric field sensor, and the high resistive semiconductor layer 20 having a single crystal structure shows very excellent semiconductor characteristics.

The thickness T of the high resistive semiconductor layer 20 is several or tens of nanometers, and preferably 15 nm. The width W of the high resistive semiconductor layer 20 may be within the same range as that of a bit size to be sensed and is several or tens of nanometers. The depth D of the high resistive semiconductor layer 20 is so small as to minimize a parasitic current and is typically tens of nanometers, possibly hundreds of nanometers. The depth D of the high resistive semiconductor layer 20 may be determined within a range for interaction against an electric field to be detected. For example, the depth D of the high resistive semiconductor layer 20 is around 50 nm.

A first insulation layer 41 is located on the low resistive semiconductor layer 10 to prevent a parasitic current, and the first insulation layer 41 is an insulation material layer, e.g., $SiO_2$ or $Si_3N_4$. The thickness of the first insulation layer 41 is, for example, around 100 nm.

The conductive layer 30 is located on the high resistive semiconductor layer 20, and the conductive layer 30 may be, for example, a silicon layer doped with a high-density n-type dopant, i.e., the same material layer as the low resistive semiconductor layer 10. In addition, the conductive layer 30 may be a metallic material having an excellent ohmic contact with the high resistive semiconductor layer 20. Even though it is not shown in FIG. 2, the conductive layer 30 may be formed on only a part corresponding to the width W and depth D of the high resistive semiconductor layer 20 in order to prevent the parasitic current. In any case, the conductive layer 30 must maintain contact with an electrode pad 62.

The high resistive semiconductor layer 20 is formed on only a partial area of the low resistive semiconductor layer 10, and such partial area is called a sensing area. Electrode pads 61 and 62 electrically contact respectively with the low resistive semiconductor layer 10 and the conductive layer 30. Electricity is supplied to the low resistive semiconductor layer 10 and the conductive layer 30 via the electrode pads 61 and 62. A current flows from the low resistive semiconductor layer 10 to the conductive layer 30 via the high resistive semiconductor layer 20 acting as a gate for controlling a flow of the current flowing from the low resistive semiconductor layer 10 to the conductive layer 30 according to semiconductor characteristics of the high resistive semiconductor layer 20. If an electric field is applied to the high resistive semiconductor layer 20, an accumulation or depletion of electrons occurs in the high resistive semiconductor layer 20 according to the polarity of the electric field. Accordingly, a gate resistance due to the high resistive semiconductor layer 20 decreases or increases.

In more detail, it is assumed that the high resistive semiconductor layer 20 is in an n-type area. When a negative (−) electric field is applied to the high resistive semiconductor layer 20, electron density in the high resistive semiconductor layer 20 decreases, thereby increasing a resistance value of the high resistive semiconductor layer 20. Accordingly, an amperage of a current flowing through the high resistive semiconductor layer 20 decreases. However, when a positive (+) electric field is applied to the high resistive semiconductor layer 20, electron density in the high resistive semiconductor layer 20 increases, thereby decreasing a resistance value of the high resistive semiconductor layer 20. Accordingly, an amperage of a current flowing through the high resistive semiconductor layer 20 increases. Thus, an electric field can be detected by detecting a current flowing from the low resistive semiconductor layer 10 to the conductive layer 30 via the high resistive semiconductor layer 20 by using an ammeter.

If the electric field sensor further has a write function, a second insulation layer 42 and a write electrode 50 are further included on the conductive layer 30. The write electrode 50 is an electrical conductor. For example, the write electrode 50 includes a metallic material, such as Al, Ag, Au, or Pt. Although it is not shown in FIGS. 1 and 2, an electrode pad that electrically contacts with the write electrode 50 is further included. By applying a voltage higher than a threshold voltage of a recording medium, as described below, to the write electrode 50, polarization of the recording medium is induced and information can be recorded.

Figure 3A:
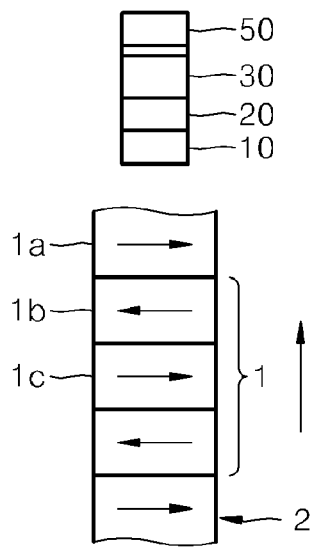
FIG. 3A is a diagram for describing a shield effect of the electric field sensor illustrated in FIG. 1.
Figure 4:
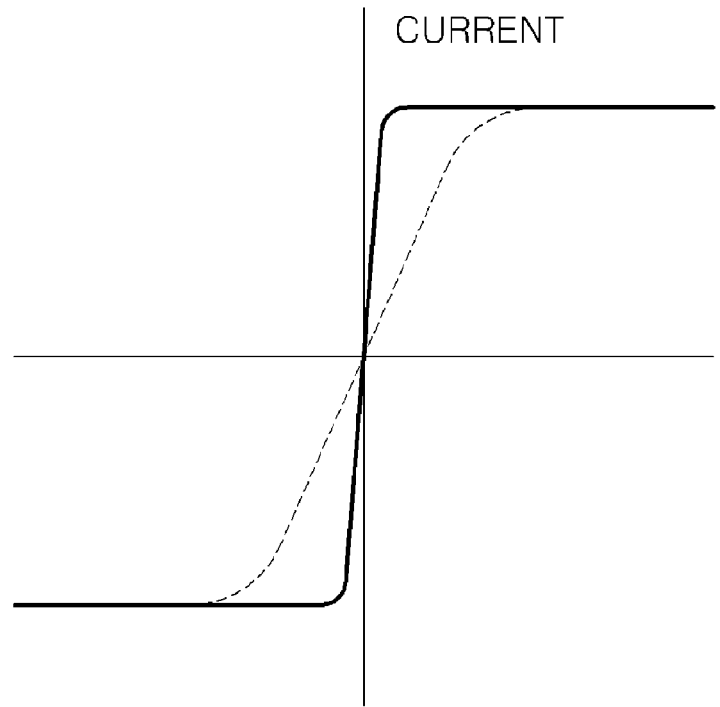
FIG. 4 is a graph showing a transition characteristic due to a shield effect.

As described above, the electric field sensor according to the present embodiment of the present invention has a vertical structure in which the low resistive semiconductor layer 10, the high resistive semiconductor layer 20, and the conductive layer 30 are laminated in the vertical direction. The low resistive semiconductor layer 10 and the conductive layer 30 act as a shield for the high resistive semiconductor layer 20 that corresponds to the sensing area. That is, a laminated direction of the low resistive semiconductor layer 10, the high resistive semiconductor layer 20, and the conductive layer 30 is the same as a relative moving direction of a detection body 2 and the electric field sensor. In more detail, as illustrated in FIG. 3A, a plurality of electrically polarized electrical domains 1 are on the detection body 2, and the electric field sensor detects an electric field of the electric domains 1 while the detection body 2 and the electric field sensor moving. When the high resistive semiconductor layer 20 detects an electric field of an electrical domain 1b, electric fields of other electric domains 1a and 1c may affect the high resistive semiconductor layer 20. However, according to the electric field sensor according to the present embodiment of the present invention, since the low resistive semiconductor layer 10 and the conductive layer 30 are electrical conductors and act as a shield, electric fields of the electric domains 1a and 1c are prevented from affecting. Thus, for example, a very sharp transition characteristic, as shown with the solid line arrow in FIG. 4, can be obtained between the electric domains 1a and 1b having different polarization directions.

Figure 3B:
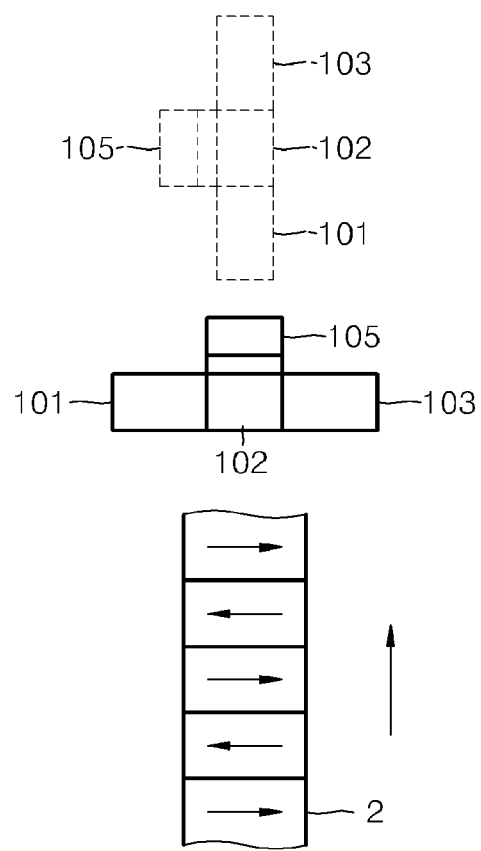
FIG. 3B is a diagram for describing a shield effect of an electric field sensor having a horizontal structure.

In a case of an electric field sensor having a horizontal structure, according to another example, since a laminated direction of a low resistive semiconductor area 101, a high resistive semiconductor area 102, and a conductive area 103 is perpendicular to the moving direction of the detection body 2 as shown in FIG. 3B, the low resistive semiconductor area 101 and the conductive area 103, which are electrical conductors, cannot act as a shield. Thus, a relatively dull transition characteristic, as shown with dotted lines in FIG. 4, can be obtained.

In the example illustrated in FIG. 3B, the electric field sensor can be arranged as shown with dotted lines. However, in this case, a write electrode 105 and the electric domains 1 are not aligned. The write electrode 105 can be located adjacent to the low resistive semiconductor area 101 or the conductive area 103; however, it is not easy in terms of fabricating process to fabricate electric field sensors having this structure.

In the case of the electric field sensor illustrated in FIG. 3A, since the write electrode 50 is located on the conductive layer 30, the write electrode 50 and the electric domains 1 are well aligned, and since the write electrode 50 can be formed by simply laminating the write electrode 50 on the conductive layer 30, it is very easy to fabricate electric field sensors having this structure.

Figure 5:
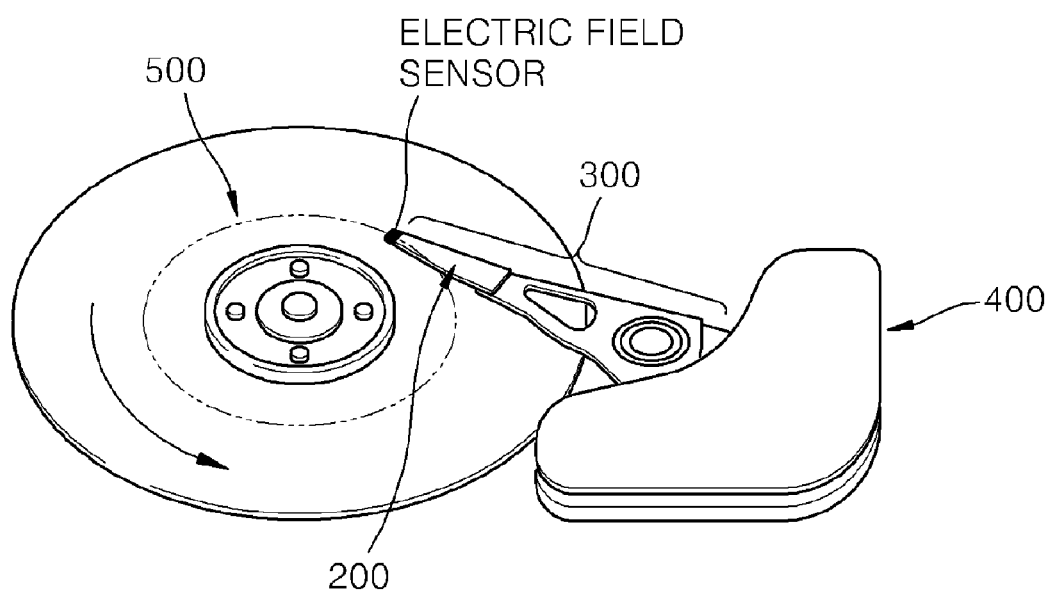
FIG. 5 is a schematic diagram of a storage unit according to an embodiment of the present invention.

FIG. 5 is a schematic diagram of a storage unit according to an embodiment of the present invention. The storage unit according to the present embodiment of the present invention is a hard disk drive (HDD) type storage unit including a recording medium 500 of a rotating disc type, and the recording medium 500 is a ferroelectric recording medium. Although not shown in FIG. 5, the recording medium 500 includes a lower electrode and a ferroelectric layer sequentially formed on a substrate that can be formed with Si and glass. The lower electrode can include an electrode material used for a semiconductor memory device and can be formed with metal, such as Pt, Al, Au, Ag, or Cu, or a metallic oxide, such as $SrRuO_3$ or $(La,Sr)CoO$, and the lower electrode is grounded. The ferroelectric layer can be formed with a ferroelectric material, such as $PZT(PbZr_xTi_{1-x}O_3)$, $PbTiO_3$, $PbZrO_3$, $SrBi_2Ta_2O_9$(SBT), $KNbO_3$, $LiTaO_3$, or $LiNbO_3$. A protective layer can be further included on the ferroelectric layer, and the protective layer can be formed by using both or one of a diamond like carbon (DLC) and ordinary lubricant used on the surface of an HDD.

The electric field sensor, as illustrated in FIGS. 1 and 2, is assembled with a suspension 200 located at an end of a swing arm 300 to suspend from the swing arm 300. In this case, as shown in FIG. 3A, the electric field sensor is assembled so that the laminating direction of the low resistive semiconductor layer 10, the high resistive semiconductor layer 20, and the conductive layer 30 is the same as a moving direction, i.e., a rotational direction, of the recording medium 500. The swing arm 300 is rotatably moved by a voice coil motor (VCM) 400. Accordingly, the electric field sensor floats above the surface of the recording medium 500 due to an air bearing effect. The driving system of an information recording and reproducing apparatus according to an embodiment of the present invention illustrated in FIG. 5 is the same as that of a conventional HDD. However, in the information recording and reproducing apparatus according to the current embodiment, a magnetic recording medium of a conventional HDD is replaced with a ferroelectric recording medium, and a magnetic read/write head of the conventional HDD is replaced with the electric field sensor.

When the low resistive semiconductor layer 10 of the electric field sensor is in an n+ type area and the high resistive semiconductor layer 20 is in an n− type area, an electrical domain of the recording medium 500 facing the high resistive semiconductor layer 20 is polarized in a first polarization direction, and then a surface electrical charge of the recording medium 500 becomes negative (−), thereby decreasing electron density of the high resistive semiconductor layer 20 and increasing a resistance of the high resistive semiconductor layer 20. Accordingly, an amperage of a current flowing from the low resistive semiconductor layer 10 to the conductive layer 30 via the high resistive semiconductor layer 20 decreases. However, when the electrical domain of the recording medium 500 facing the high resistive semiconductor layer 20 is polarized in a second polarization direction, and then a surface electrical charge of the recording medium 500 becomes positive (+), thereby increasing electron density of the high resistive semiconductor layer 20 and decreasing a resistance of the high resistive semiconductor layer 20. Accordingly, an amperage of the current flowing from the low resistive semiconductor layer 10 to the conductive layer 30 via the high resistive semiconductor layer 20 increases. Based on a change of the amperage, information recorded on the surface of the recording medium 500 can be read.

The write electrode 50 is used to write information by inducing the polarization of the recording medium 500 and is electrically grounded or floated while reproduction. When recording is performed, a voltage of which an absolute value is greater than an absolute value of a threshold voltage inducing the polarization of the recording medium 500 is applied to the write electrode 50. By doing this, the electrical domain of the recording medium 500 can be polarized in the first or second polarization direction.

A method of fabricating the electric field sensor according to an embodiment of the present invention will now be described. Hereinafter, a case where the low resistive semiconductor layer 10 and the high resistive semiconductor layer 20 are n-type semiconductor material layers using Si as a base material will be described.

Figure 6A:
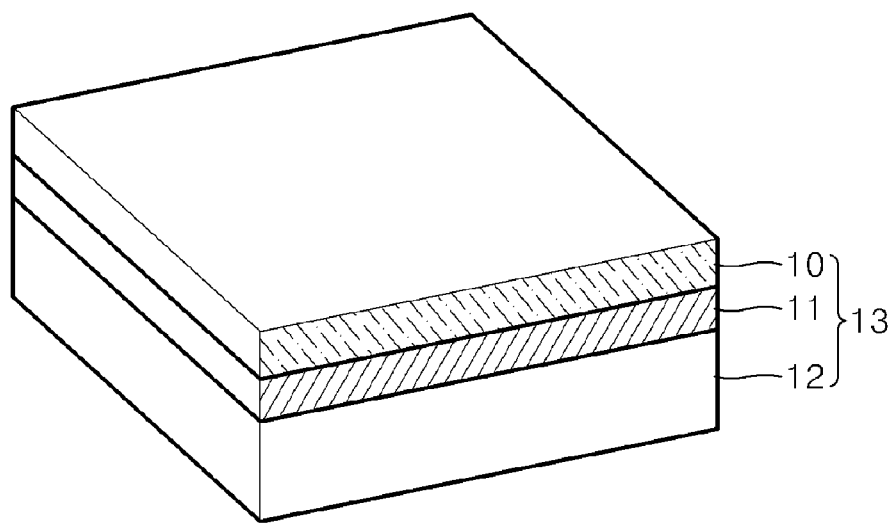
FIGS. 6A through 6M are diagrams for describing a method of fabricating an electric field sensor, according to an embodiment of the present invention.

As illustrated in FIG. 6A, the substrate 13 in which the low resistive semiconductor layer 10 doped with a high-density n-type dopant is formed as the top layer and insulated from the lower layer 12 is prepared. As described above, for the substrate 13, a commercially available single crystal SOI substrate doped with a high-density n-type dopant can be used.

Figure 8A:
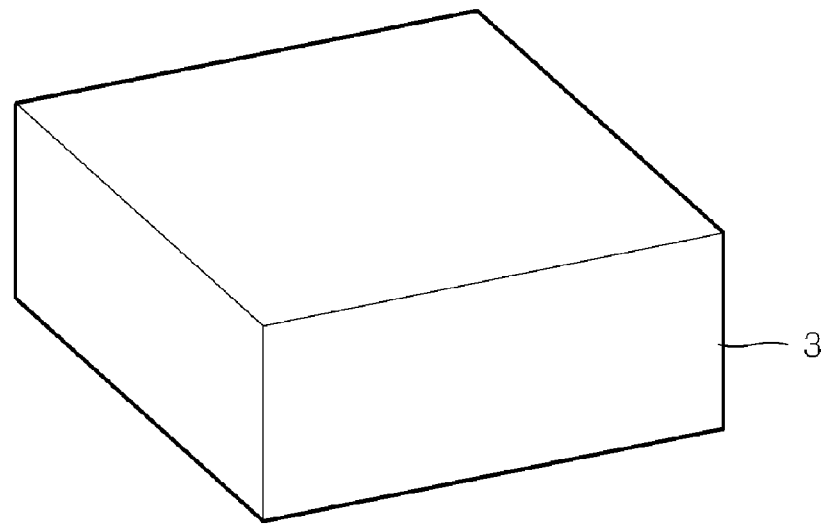
FIGS. 8A and 8B are diagrams for describing a method of manufacturing a substrate according to an embodiment of the present invention.
Figure 8B:
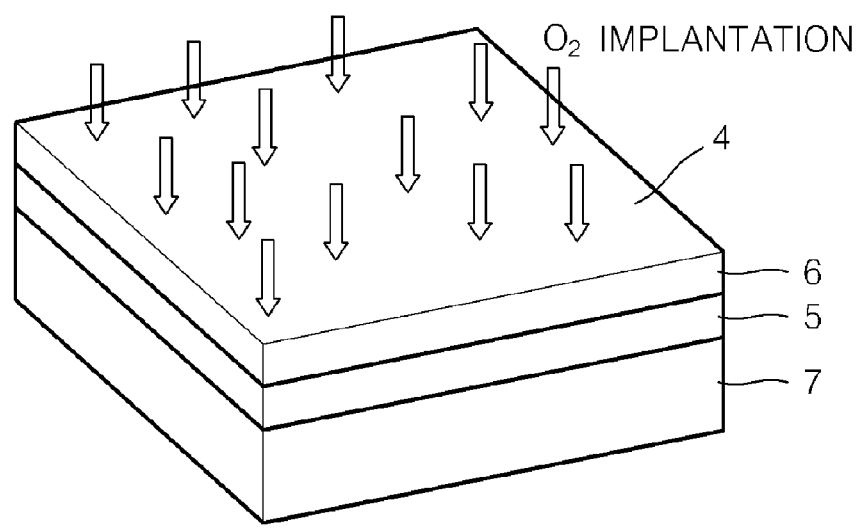

The substrate 13 may be fabricated by a process illustrated in FIGS. 8A and 8B. As illustrated in FIG. 8A, a single crystal silicon wafer 3 doped with an n-type dopant having a high density of $10^{21}/cm^3$ is prepared. Oxygen is implanted into the single crystal silicon wafer 3. Then, as illustrated in FIG. 8B, an oxygen implantation layer 5 is formed a little bit apart downward from a surface 4 of the single crystal silicon wafer 3. Oxygen does not exist in a layer 6 including the surface 4. An annealing process is performed. Then, $SiO_2$ is generated due to a reaction of the oxygen and the silicon in the oxygen implantation layer 5, and the layer 6 is maintained in a low resistive state. Since $SiO_2$ is a nonconductor of electricity, the layer 6 is insulated from a layer 7 by $SiO_2$. The thickness of the oxygen implantation layer 5 is adjusted from tens to hundreds of nanometers. By these processes, the substrate 13 is fabricated such that the low resistive semiconductor layer 10 is formed as the top layer of the substrate 13 and is insulated from the lower layer 12 by the insulation layer 11.

Figure 9:
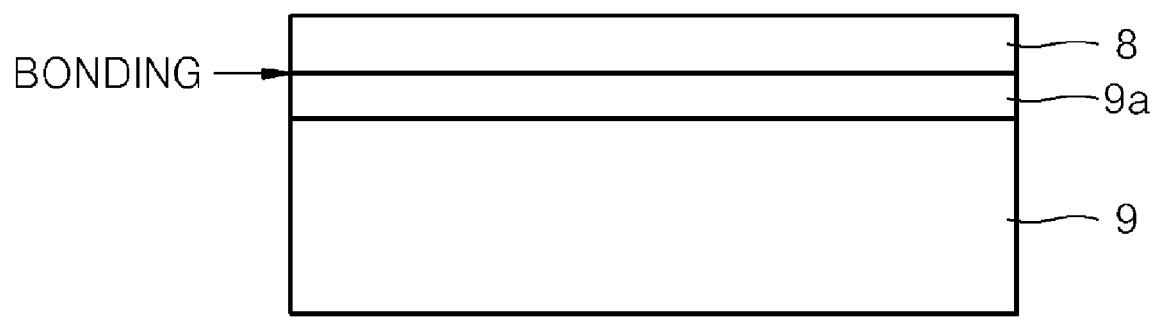
FIG. 9 is a diagram for describing a method of manufacturing a substrate according to another embodiment of the present invention.

According to another embodiment of the present invention, as illustrated in FIG. 9, the substrate 13 may be fabricated by bonding a silicon wafer 8 doped with an n-type dopant having a thickness of tens or hundreds of nanometers and a high density of $10^{21}/cm^3$ on an insulation wafer 9, such as glass or silicon, on which an insulation layer 9a is formed.

Figure 6B:
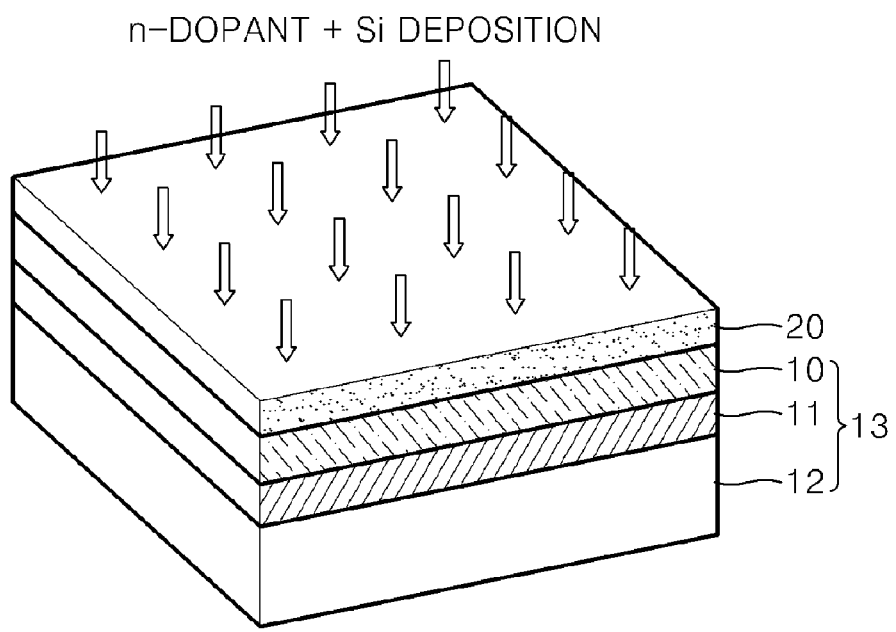

The high resistive semiconductor layer 20 illustrated in FIG. 6B is formed by depositing an n-type dopant having a density of $10^{15}/cm^3$ and silicon on the low resistive semiconductor layer 10 with a thickness of several or tens of nanometers. This process can be performed by chemical vapor deposition (CVD) at, for example, a temperature of around 550° C. and a low pressure. By the CVD process, the doping density of the n-type dopant can be very accurately and effectively controlled. In addition, since the low resistive semiconductor layer 10 acts as a template in the CVD process, the high resistive semiconductor layer 20 becomes a silicon layer having an epitaxial single crystal structure on the low resistive semiconductor layer 10. Thus, the high resistive semiconductor layer 20 having good semiconductor characteristics can be obtained.

Figure 6C:
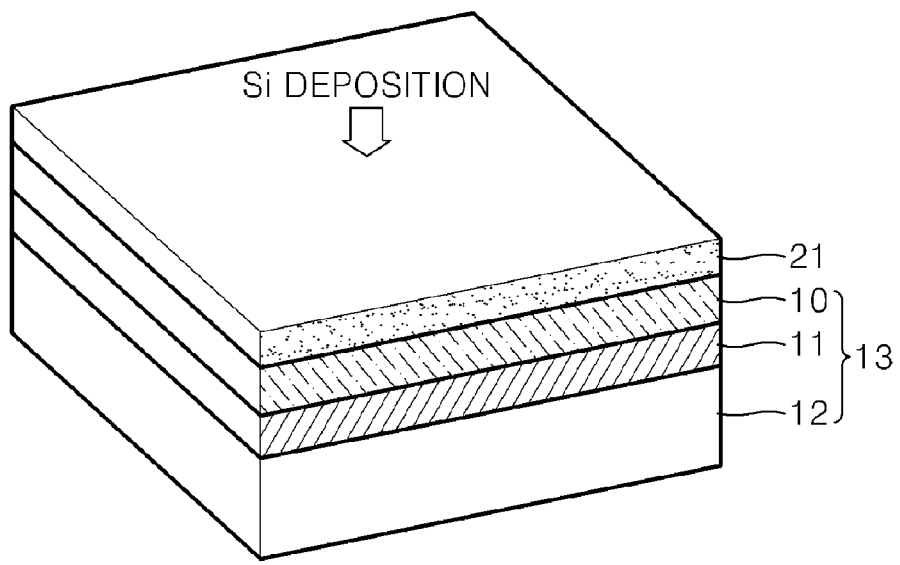
Figure 6D:
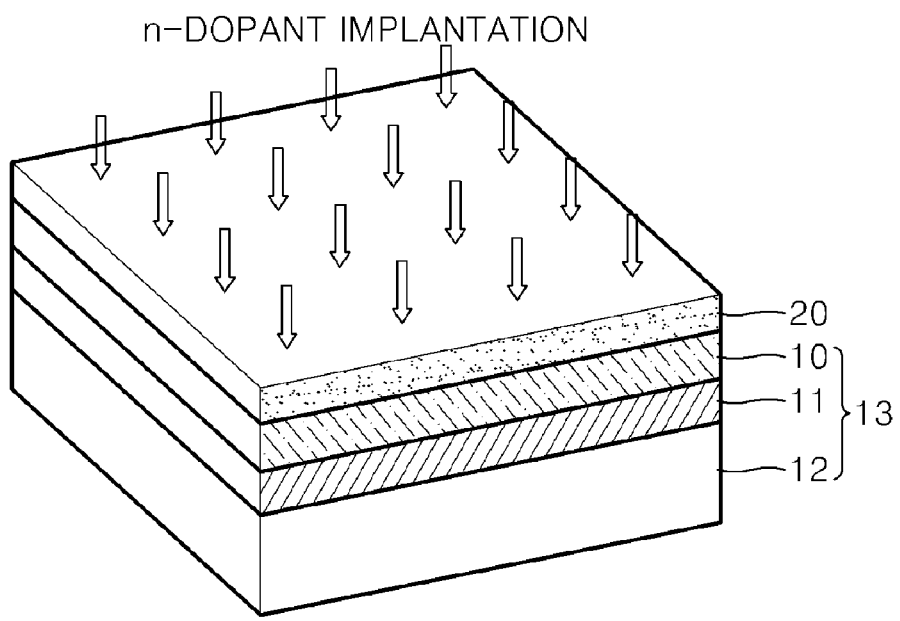

The high resistive semiconductor layer 20 can be obtained in another way. As illustrated in FIG. 6C, a silicon layer 21 is formed by depositing pure silicon on the low resistive semiconductor layer 10 to a thickness of several or tens of nanometers, preferably 15 nm, by using the CVD method at a temperature of around 550° C. and a low pressure. Then, an n-type dopant having a low density of $10^{15}/cm^3$ is implanted into the silicon layer 21 as illustrated in FIG. 6D. By doing this, the high resistive semiconductor layer 20 illustrated in FIG. 6B can be obtained. In this case, since the low resistive semiconductor layer 10 also acts as a template, the high resistive semiconductor layer 20 becomes a silicon layer having an epitaxial single crystal structure on the low resistive semiconductor layer 10.

Before performing the process of depositing the high resistive semiconductor layer 20, a process of removing an oxide, in particular $SiO_2$, from a surface of the low resistive semiconductor layer 10 can be performed. For example, $SiO_2$ can be removed by dipping the substrate into water ($H_2O$) containing 10% HF for around 30 seconds.

Figure 6E:
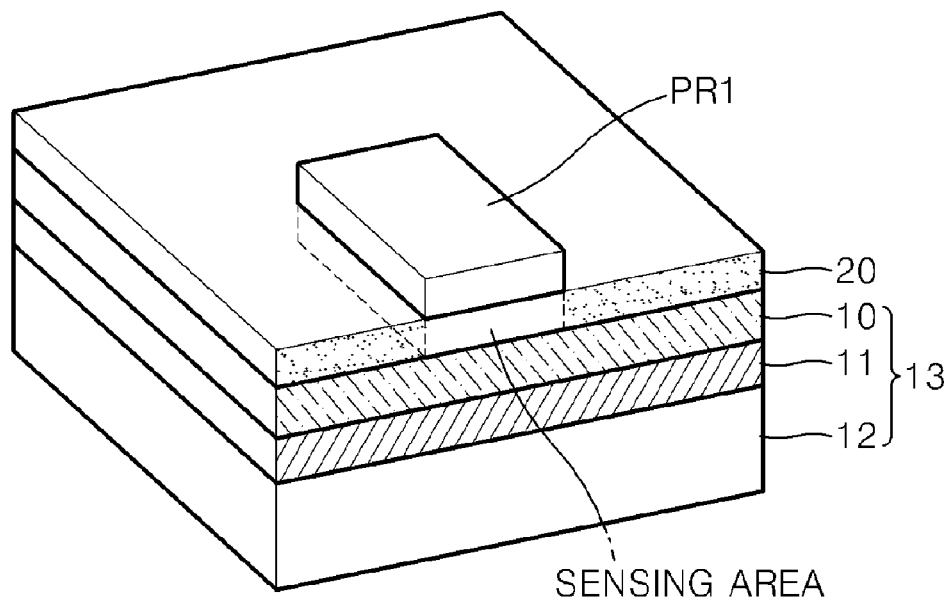
Figure 6F:
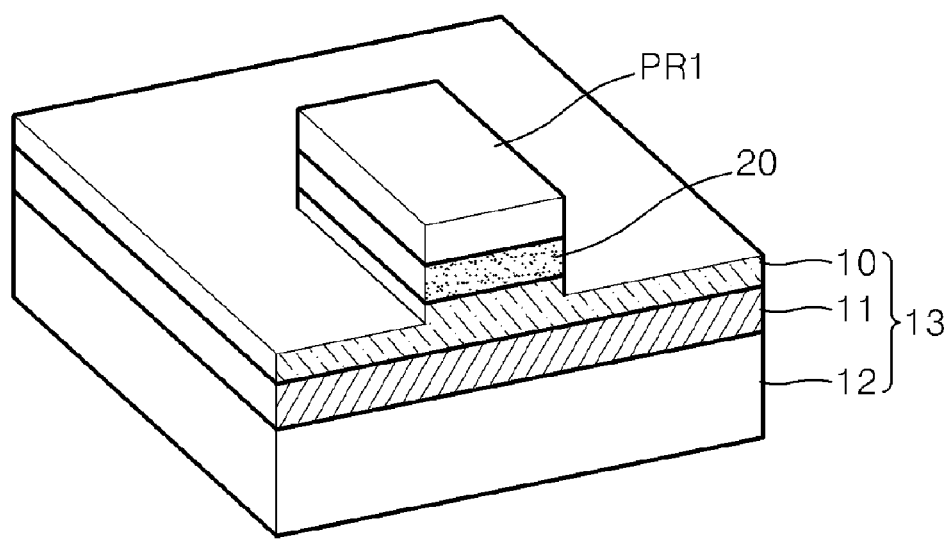

A process of patterning the high resistive semiconductor layer 20 is performed so that the high resistive semiconductor layer 20 remains on only a partial area of the low resistive semiconductor layer 10. As illustrated in FIG. 6E, a mask PR1, defining a sensing area, is formed on the high resistive semiconductor layer 20. This process can be performed by a conventional lithography method. The mask PR1 is, for example, a photo register. An e-beam lithography method is preferably used, and such e-beam lithography method has an excellent resolution, and in particular, can form a mask having a thickness of less than 10 nm for silicon. The size of the mask PR1 corresponds to the size of a preferable sensing area. Thus, the width of the mask PR1 is several or tens of nanometers such that the width is within the same range as a bit size to be sensed. The depth of the mask PR1 is tens of nanometers and can be hundreds of nanometers. As illustrated in FIG. 6F, the high resistive semiconductor layer 20, except for the part for the sensing area below the mask PR1, is removed by performing an etching process. In this case, in order to firmly remove the high resistive semiconductor layer 20, overetching is preferably performed until a portion of the low resistive semiconductor layer 10 is also removed.

Figure 6G:
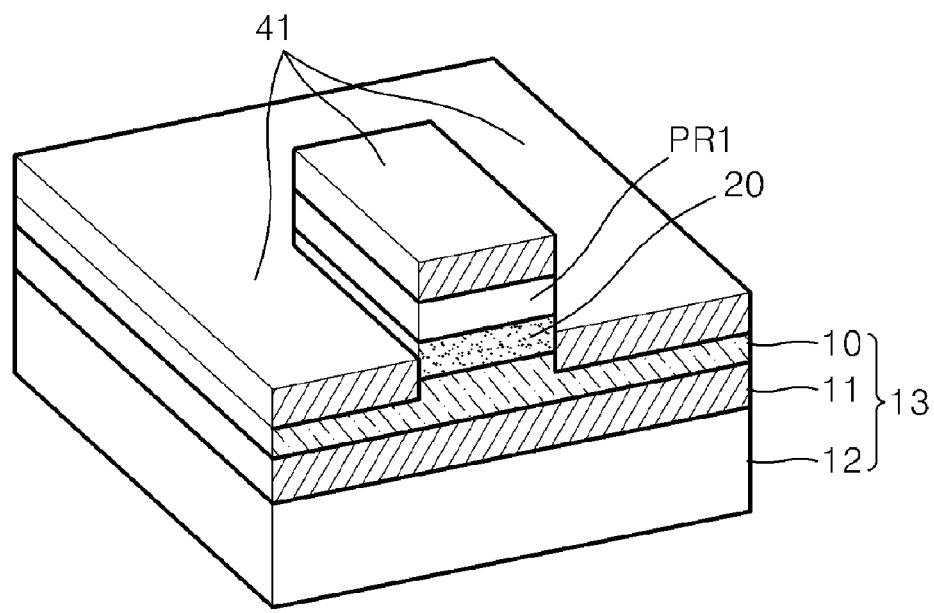
Figure 6H:
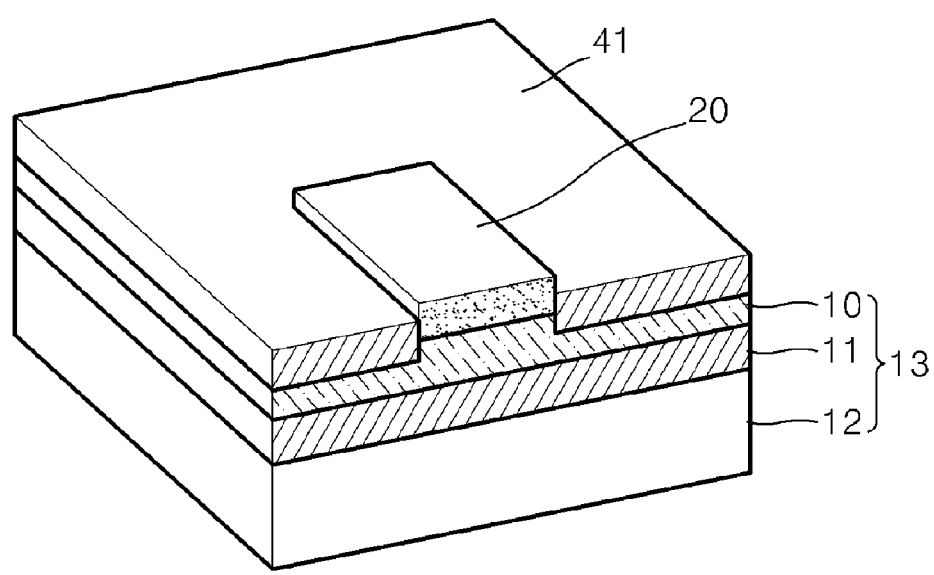
Figure 6I:
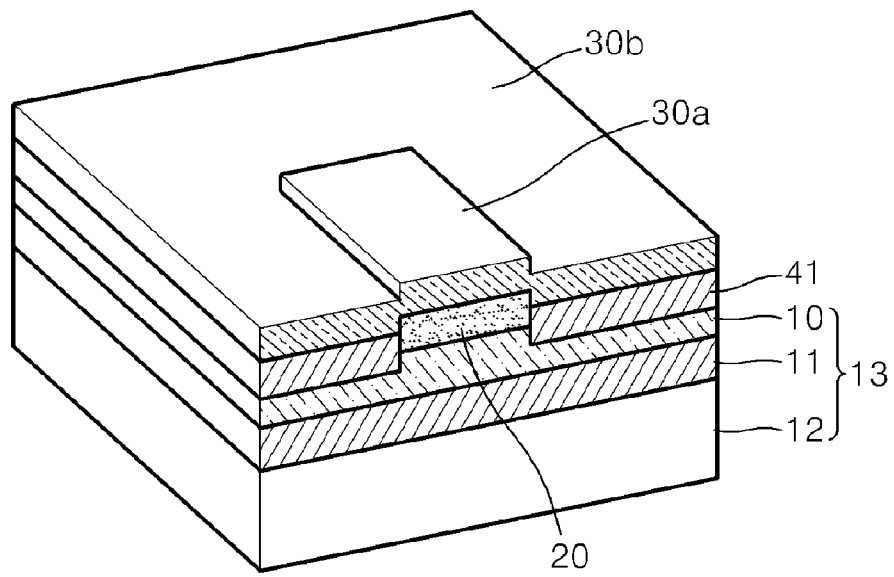

A process of forming the conductive layer 30 is performed. As illustrated in FIG. 6G, the first insulation layer 41 is formed by depositing an insulation material on the mask PR1 and the exposed low resistive semiconductor layer 10. For the insulation material, for example, $SiO_2$ or $Si_3N_4$ can be used. The thickness of the first insulation layer 41 is, for example, around 100 nm. A process of removing an oxide from a surface of the high resistive semiconductor layer 20, in particular $SiO_2$, can be performed. For example, $SiO_2$ on the high resistive semiconductor layer 20 can be removed by dipping the substrate 13 in which the high resistive semiconductor layer 20 is laminated into water ($H_2O$) containing 10% HF for around 30 seconds. As illustrated in FIG. 6H, the first insulation layer 41 on the mask PR1 is removed together with the mask PR1 by using a proper solvent, and thus, the high resistive semiconductor layer 20 is exposed. An electrical conductor is deposited onto the exposed high resistive semiconductor layer 20. For the electrical conductor, the same material as that of the low resistive semiconductor layer 10 or a metallic material having an excellent ohmic contact with the high resistive semiconductor layer 20 can be used. Hereinafter, it is assumed that the same material as that of the low resistive semiconductor layer 10, i.e., silicon doped with a high-density n-type dopant, is used as the electrical conductor. Silicon and an n-type dopant having a density of $10^{20}/cm^3$ are deposited on the exposed high resistive semiconductor layer 20 and the first insulation layer 41. This process can be performed by a CVD method at a temperature of around 550° C and a low pressure. Then, as illustrated in FIG. 6I, low resistive silicon layers 30a and 30b are formed on the exposed high resistive semiconductor layer 20 and the first insulation layer 41. The low resistive silicon layer 30b formed on the first insulation layer 41 is a poly-silicon layer. However, the low resistive silicon layer 30a formed on the exposed high resistive semiconductor layer 20 becomes an epitaxial single crystal silicon layer.

It is preferable that the low resistive silicon layer 30b, not the low resistive silicon layer 30a, be removed except for an area for forming the electrode pad 62 described below. Then, the low resistive silicon layer 30a actually acts as the conductive layer 30.

According to the processes described above, the electric field sensor having a vertical structure in which the low resistive semiconductor layer 10, the high resistive semiconductor layer 20, and the conductive layer 30 are laminated in order is fabricated.

Figure 6J:
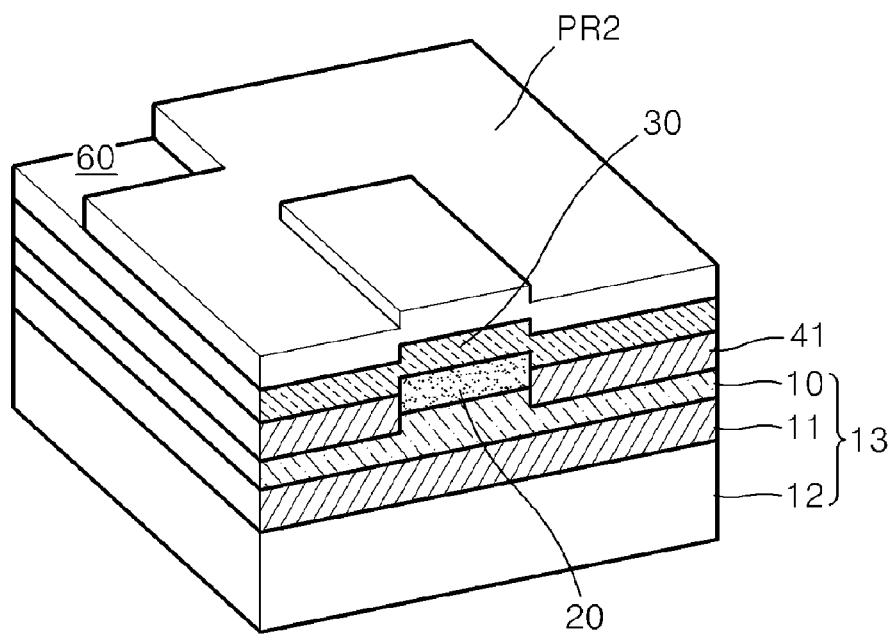
Figure 6K:
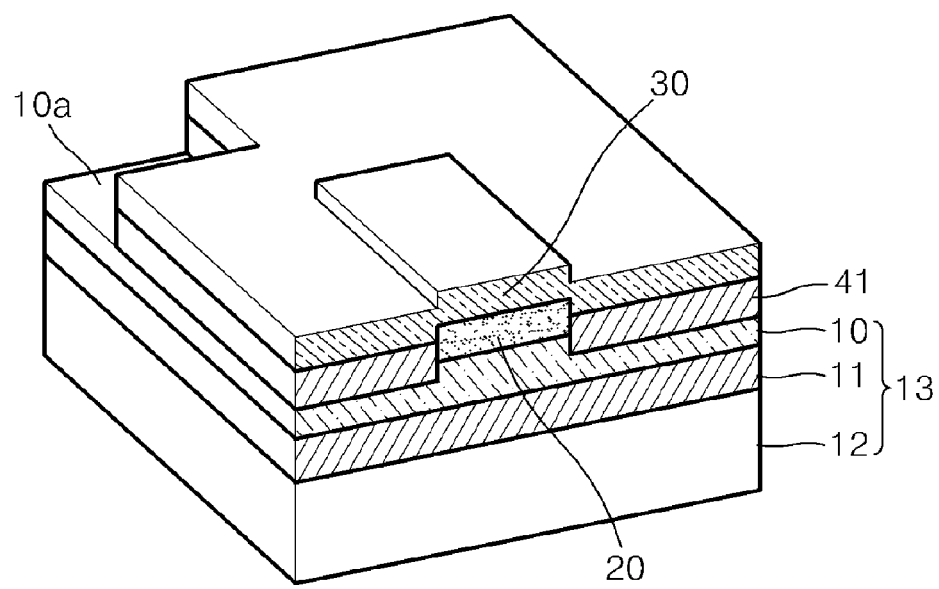
Figure 6L:
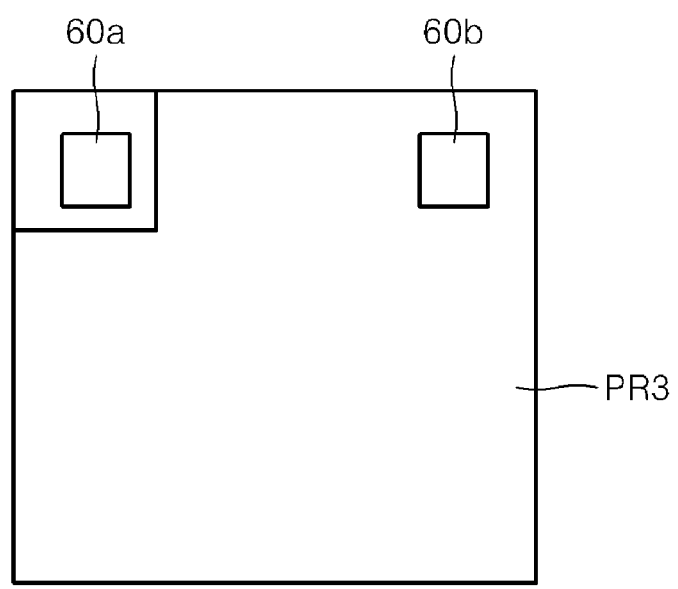
Figure 6M:
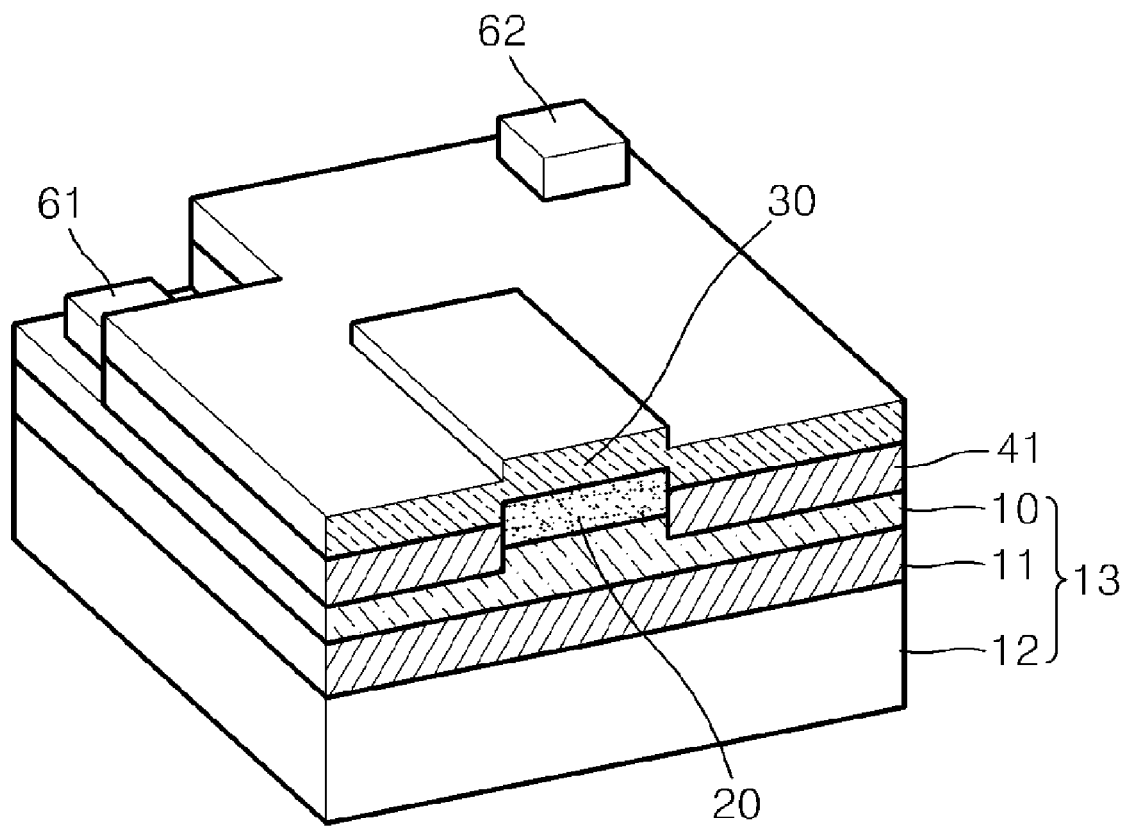

An example of a process of forming the electrode pads 61 and 62 will now be described. The process of forming the electrode pads 61 and 62 can be performed by a lithography process and a depositing process. As illustrated in FIG. 6J, a mask PR2 is formed on the conductive layer 30, not on an electrode area 60 in which the electro pad 61 is to be formed. By performing an etching process using the mask PR2, the conductive layer 30 and the first insulation layer 41 for the electrode area 60 are removed. By removing the mask PR2, an area 10a of the low resistive semiconductor layer 10 is exposed as illustrated in FIG. 6K. As illustrated in FIG. 6L, a mask PR3 is formed on the exposed area 10a of the low resistive semiconductor layer 10 and the exposed conductive layer 30, except for an area 60a in which the electrode pad 61 is to be formed in the exposed area 10a and an area 60b in which the electrode pad 62 is to be formed on the conductive layer 30. The electrode pads 61 and 62 are formed by depositing, for example, Al using the mask PR3, and then, the mask PR3 is removed. Then, as illustrated in FIG. 6M, the electric field sensor in which the electro pads 61 and 62 are formed can be obtained.

Although not shown, the write electrode 50 is formed by depositing the second insulation layer 42 on the conductive layer 30, and then, depositing metal, such as Al, Ag, Au, or Pt, on the second insulation layer 42. It is understood by one of ordinary skill in the art that this process can be performed by a masking process using a conventional lithography method, a depositing process, and a process of removing a mask.

According to the processes described above, the electric field sensor illustrated in FIGS. 1 and 2 is obtained.

A method of fabricating an electric field sensor according to another embodiment of the present invention will now be described. It is also assumed that the low resistive semiconductor layer 10 and the high resistive semiconductor layer 20 are n-type semiconductor material layers in which Si is the base material.

Figure 7A:
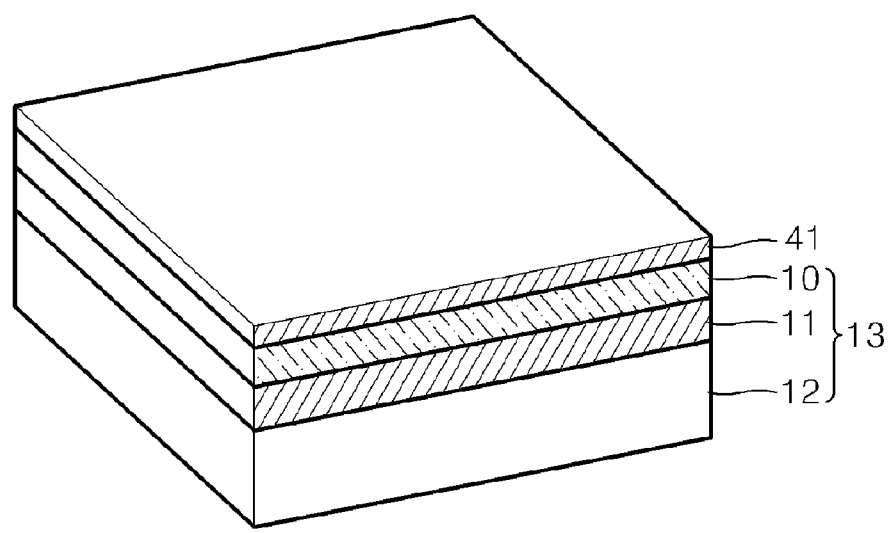
FIGS. 7A through 7F are diagrams for describing a method of fabricating an electric field sensor according to another embodiment of the present invention.

In the method of fabricating an electric field sensor according to another embodiment of the present invention, the substrate 13 in which the low resistive semiconductor layer 10 doped with a high-density n-type dopant is formed as the top layer of the substrate 13 and insulated from the lower layer 12 is also prepared as illustrated in FIG. 6A. As illustrated in FIG. 7A, the first insulation layer 41 is formed by depositing an insulation material, such as $SiO_2$, $Si_3N_4$, on the low resistive semiconductor layer 10. The first insulation layer 41 may be formed by forming $SiO_2$ by oxidizing the low resistive semiconductor layer 10 that is a high resistive silicon layer. The thickness of the first insulation layer 41 is, for example, around 100 nm.

Figure 7B:
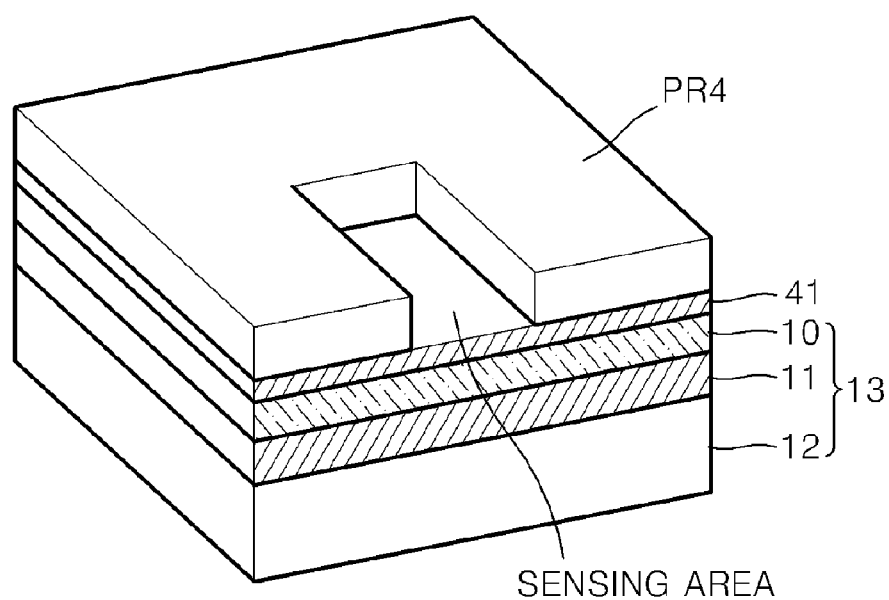
Figure 7C:
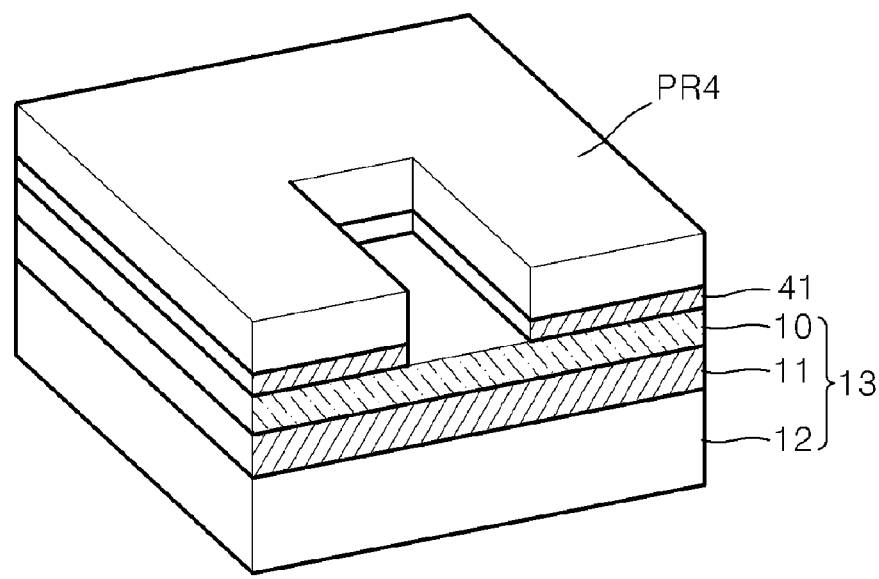

As illustrated in FIG. 7B, a mask PR4 is formed on an area of the first insulation layer 41, however except for a sensing area of the first insulation layer 41. For example, this process can be performed by laminating a photo register on the first insulation layer 41 using an e-beam lithography method. The exposed first insulation layer 41 is removed by using an etching process. Then, as illustrated in FIG. 7C, a portion of the low resistive semiconductor layer 10 is exposed.

Figure 7D:
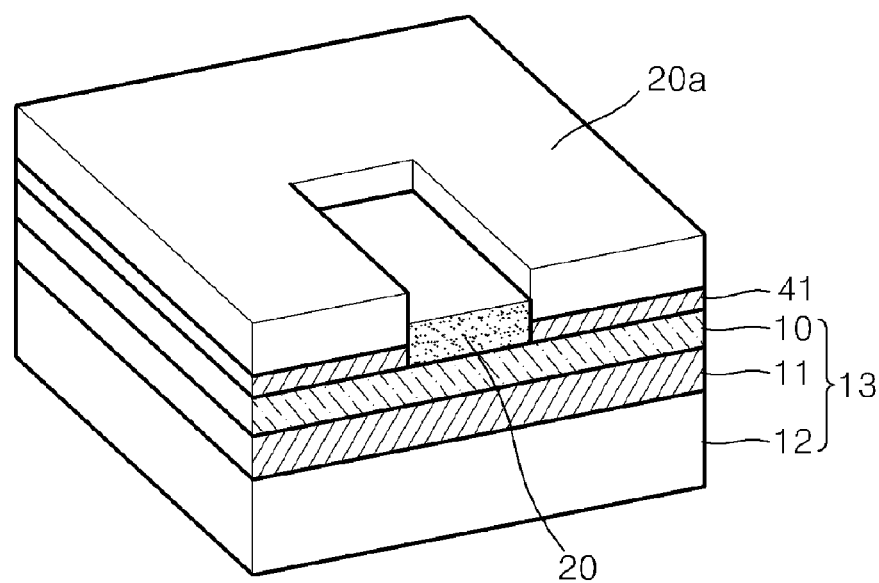

The mask PR4 is removed, and high resistive semiconductor layers 20 and 20a are formed by depositing an n-type dopant having a density of $10^{15}/cm^3$ and silicon on the exposed low resistive semiconductor layer 10 and the first insulation layer 41 with a thickness of several or tens of nanometers. This process can be performed by CVD at, for example, a temperature of around 550° C. and a low pressure. By the CVD process, a doping density of the n-type dopant can be very accurately and effectively controlled. As illustrated in FIG. 7D, the high resistive semiconductor layer 20a formed on the first insulation layer 41 is a poly-silicon layer. Also, in this process, since the low resistive semiconductor layer 10 acts as a template, the high resistive semiconductor layer 20 becomes an epitaxial single crystal silicon layer on the low resistive semiconductor layer 10. Thus, the high resistive semiconductor layer 20 having excellent semiconductor characteristics can be obtained.

Before performing the process of forming the high resistive semiconductor layers 20 and 20a, a process of removing an oxide, in particular $SiO_2$, from a surface of the low resistive semiconductor layer 10 can be performed. For example, $SiO_2$ on the exposed low resistive semiconductor layer 10 can be removed by dipping the substrate 13 on which the first insulation layer 41 is formed into water ($H_2O$) containing 10% HF for around 30 seconds, and this process can be performed before or after the mask PR4 is removed.

Figure 7E:
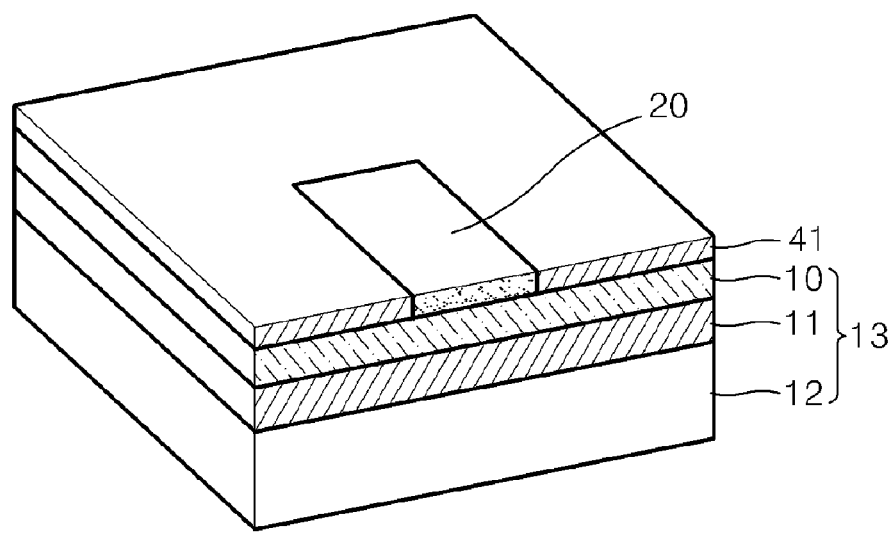

As illustrated in FIG. 7E, the high resistive semiconductor layer 20a formed on the first insulation layer 41 is removed. In this case, a portion of the high resistive semiconductor layer 20 also can be removed such that the top surfaces of the first insulation layer 41 and the high resistive semiconductor layer 20 are flush with each other. This process can be performed by, for example, a chemical-mechanical-polishing (CMP) process. In this case, the high resistive semiconductor layer 20a is perfectly removed by performing the CMP process until a portion of the first insulation layer 41 is removed or until the top surfaces of the first insulation layer 41 and the high resistive semiconductor layer 20 are flush with each other.

Figure 7F:
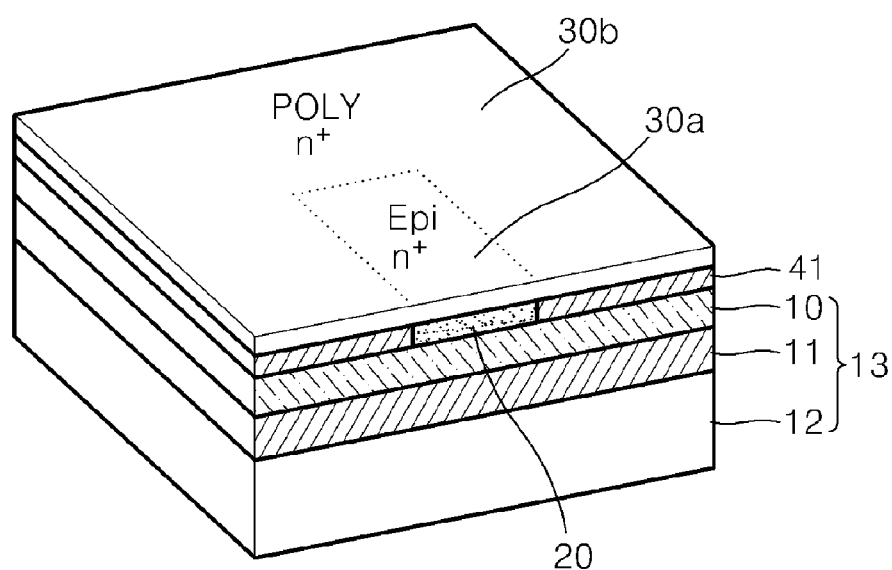

A process of forming the conductive layer 30 by depositing an electrical conductor is performed. For the electrical conductor, the same material as that of the low resistive semiconductor layer 10 or a metallic material having an excellent ohmic contact with the high resistive semiconductor layer 20 can be used. Hereinafter, it is assumed that the same material as that of the low resistive semiconductor layer 10, i.e., silicon doped with a high-density n-type dopant, is used as the electrical conductor. Silicon and an n-type dopant having a density of $10^{20}/cm^3$ are deposited on the exposed high resistive semiconductor layer 20 and the first insulation layer 41. This process can be performed by a CVD method at a temperature of around 550° C. and a low pressure. Then, as illustrated in FIG. 7F, low resistive silicon layers 30a and 30b are correspondingly formed on the exposed high resistive semiconductor layer 20 and the first insulation layer 41. The low resistive silicon layer 30b formed on the first insulation layer 41 is a poly-silicon layer. In detail, the low resistive silicon layer 30a correspondingly formed on the exposed high resistive semiconductor layer 20 becomes an epitaxial single crystal silicon layer. It is preferable that the low resistive silicon layer 30b, not the low resistive silicon layer 30a, be removed except for an area for forming the electrode pad 62 described below. Then, the low resistive silicon layer 30a actually acts as the conductive layer 30.

Before performing the process of forming the conductive layer 30, a process of removing an oxide, in particular $SiO_2$, from a surface of the high resistive semiconductor layer 20 can be performed. For example, $SiO_2$ on the high resistive semiconductor layer 20 can be removed by dipping the substrate 13 on which the high resistive semiconductor layer 20 and the first insulation layer 41 are laminated into water ($H_2O$) containing 10% HF for around 30 seconds.

The process of forming the electrode pads 61 and 62 illustrated in FIGS. 6J through 6M and the process of forming the write electrode 50 are performed.

According to the processes described above, the thin film type electric field sensor having an epitaxial vertical structure illustrated in FIGS. 1 and 2 is obtained.

According to the fabricating method described above, the high resistive semiconductor layer 20 is formed on a partial area of the low resistive semiconductor layer 10 by the depositing process using the CVD method and the etching process using the lithography method. According to the fabricating method described above, the size of the high resistive semiconductor layer 20, i.e. the size of a sensing area, can be very minutely controlled. Since the high resistive semiconductor layer 20 is a core area for detecting an electric field, a doping density of a dopant must be minutely controlled. According to the depositing process using the CVD method, a doping density can be minutely controlled, and thus, the high resistive semiconductor layer 20 having excellent semiconductor characteristics can be formed.

As an example for comparison, in the case of the electric field sensor having a horizontal structure illustrated in FIG. 3B, the high resistive semiconductor area 102 formed on a silicon wafer is masked, and a high-density dopant is doped in the silicon wafer. Then, the low resistive semiconductor area 101 and the conductive area 103 are formed. The dopant of the low resistive semiconductor area 101 and the conductive area 103 are diffused by performing the annealing process. By doing this, the high resistive semiconductor area 102 is formed between the low resistive semiconductor area 101 and the conductive area 103. The diffusion process is performed at a relatively high temperature. According to a method of forming the high resistive semiconductor area 102 using the diffusion process, it is not easy to minutely control a doping density of a dopant of the high resistive semiconductor area 102.

As described above, according to the fabricating method of an embodiment of the present invention, since the diffusion process is unnecessary in the process of forming the high resistive semiconductor layer 20, a high temperature process is unnecessary, and an accurate dopant density control can be performed by using the CVD method.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. An electric field sensor comprising:
   a substrate having a low resistive semiconductor layer doped with high density dopant as the top layer of the substrate;
   a high resistive semiconductor layer doped with a low-density dopant, the high resistive semiconductor layer located at a partial area on the low resistive semiconductor layer; and
   a conductive layer located on the high resistive semiconductor layer, wherein a change of an electric field is detected by a change of a current flowing through the low resistive semiconductor layer, the high resistive semiconductor layer, and the conductive layer.

2. The electric field sensor of claim 1, wherein the low resistive semiconductor layer is insulated from a material forming the substrate by an insulation layer.

3. The electric field sensor of claim 1, further comprising a first insulation layer located on the low resistive semiconductor layer, except for the partial area on which the high resistive semiconductor layer is located.

4. The electric field sensor of claim 1, wherein the low resistive semiconductor layer and the high resistive semiconductor layer are semiconductor layers having an epitaxial single crystal structure.

5. The electric field sensor of claim 1, further comprising a write electrode formed on a second insulation layer located on the conductive layer.

6. A storage unit comprising:
   a ferroelectric recording medium; and
   an electric field sensor reading information on the ferroelectric recording medium based on a change of a current according to a magnitude of an electric field induced by a polarization voltage of an electrical domain of the ferroelectric recording medium,
   the electric field sensor comprising:
   a substrate having a low resistive semiconductor layer doped with a high-density dopant as the top layer of the substrate;
   a high resistive semiconductor layer doped with a low-density dopant, the high resistive semiconductor layer located at a partial area on the low resistive semiconductor layer; and
   a conductive layer located on the high resistive semiconductor layer,
   wherein the low resistive semiconductor layer, the high resistive semiconductor layer, and the conductive layer are located in a relative movement direction of the recording medium and the electric field sensor.

7. The storage unit of claim 6, wherein the low resistive semiconductor layer is insulated from a material forming the substrate by an insulation layer.

8. The storage unit of claim 6, wherein the electric field sensor further comprises a first insulation layer located on the low resistive semiconductor layer, except for the partial area on which the high resistive semiconductor layer is located.

9. The storage unit of claim 6, wherein the low resistive semiconductor layer and the high resistive semiconductor layer are semiconductor layers having an epitaxial single crystal structure.

10. The storage unit of claim 6, wherein the electric field sensor further comprises a write electrode formed on a second insulation layer located on the conductive layer.

11. A method of fabricating an electric field sensor, the method comprising:
    preparing a substrate in which a low resistive semiconductor layer insulated from an area below the low resistive semiconductor layer and doped with a high-density dopant is formed as the top layer of the substrate;
    forming a high resistive semiconductor layer doped with a low-density dopant on a partial area on the low resistive semiconductor layer; and
    forming a conductive layer on the high resistive semiconductor layer.

12. The method of claim 11, wherein the forming of the high resistive semiconductor layer on the partial area comprises:
    forming the high resistive semiconductor layer on the low resistive semiconductor layer by epitaxial depositing a low-density dopant and the same material as a base material of the low resistive semiconductor layer;
    forming a mask on the high resistive semiconductor layer such that the mask corresponds to the partial area; and
    etching the high resistive semiconductor layer, except for the partial area, by using the mask until the low resistive semiconductor layer is exposed.

13. The method of claim 12, wherein the forming of the conductive layer comprises:
    forming a first insulation layer on the mask and the exposed low resistive semiconductor layer;
    exposing the high resistive semiconductor layer by removing the first insulation layer on the mask and the mask; and
    forming the conductive layer by depositing an electrical conductor on the exposed high resistive semiconductor layer.

14. The method of claim 13, wherein the electrical conductor is a low resistive semiconductor material doped with a high-density dopant.

15. The method of claim 13, wherein the electrical conductor includes a metallic material that ohmic-contacts with the high resistive semiconductor layer.

16. The method of claim 11, wherein the forming of the high resistive semiconductor layer on the partial area comprises:
    epitaxial depositing the same material as a base material of the low resistive semiconductor layer on the low resistive semiconductor layer;
    forming the high resistive semiconductor layer by implanting a low-density dopant into the deposited material layer;
    forming a mask on the high resistive semiconductor layer such that the mask corresponds to the partial area; and
    etching the high resistive semiconductor layer, except for the partial area, by using the mask until the low resistive semiconductor layer is exposed.

17. The method of claim 16, wherein the forming of the conductive layer comprises:
    forming a first insulation layer on the mask and the exposed low resistive semiconductor layer;
    exposing the high resistive semiconductor layer by removing the first insulation layer on the mask and the mask; and
    forming the conductive layer by depositing an electrical conductor on the exposed high resistive semiconductor layer.

18. The method of claim 17, wherein the electrical conductor is a low resistive semiconductor material doped with a high-density dopant.

19. The method of claim 17, wherein the electrical conductor includes a metallic material that ohmic-contacts with the high resistive semiconductor layer.

20. The method of claim 11, wherein the forming of the high resistive semiconductor layer on the partial area comprises:
    forming a first insulation layer on the low resistive semiconductor layer;
    forming a mask on the first insulation layer, except on the partial area;
    exposing the low resistive semiconductor layer by etching the first insulation layer corresponding to the partial area by using the mask;

removing the mask;

forming the high resistive semiconductor layer by depositing a low-density dopant and a semiconductor material on the exposed low resistive semiconductor layer and the first insulation layer; and removing the high resistive semiconductor layer until the first insulation layer is exposed in an area except for the partial area.

21. The method of claim 20, wherein the removing of the high resistive semiconductor layer comprises polishing the high resistive semiconductor layer until the first insulation layer is exposed.

22. The method of claim 21, wherein the polishing of the high resistive semiconductor layer is performed by a chemical-mechanical-polishing (CMP) process.

23. The method of claim 11, further comprising forming a second insulation layer in an area in which the high resistive semiconductor layer on the conductive layer is formed and forming a write electrode on the second insulation layer.

* * * * *